Oct. 20, 1953
C. C. PIERCE
2,656,094
TIRE PRESSURE DEVICE
Filed July 9, 1951
2 Sheets-Sheet 1
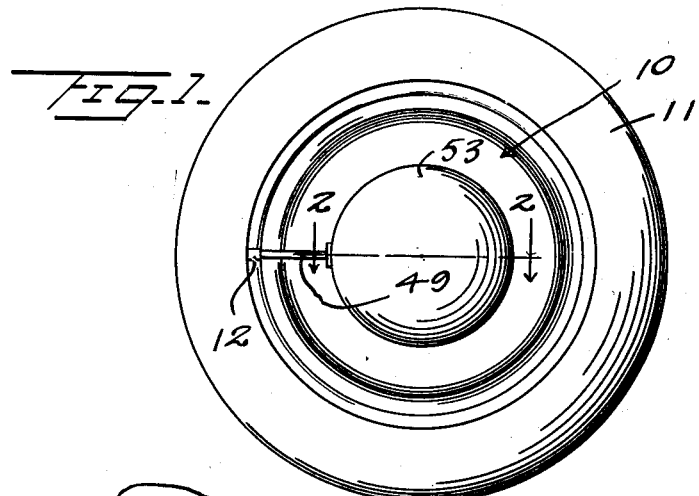
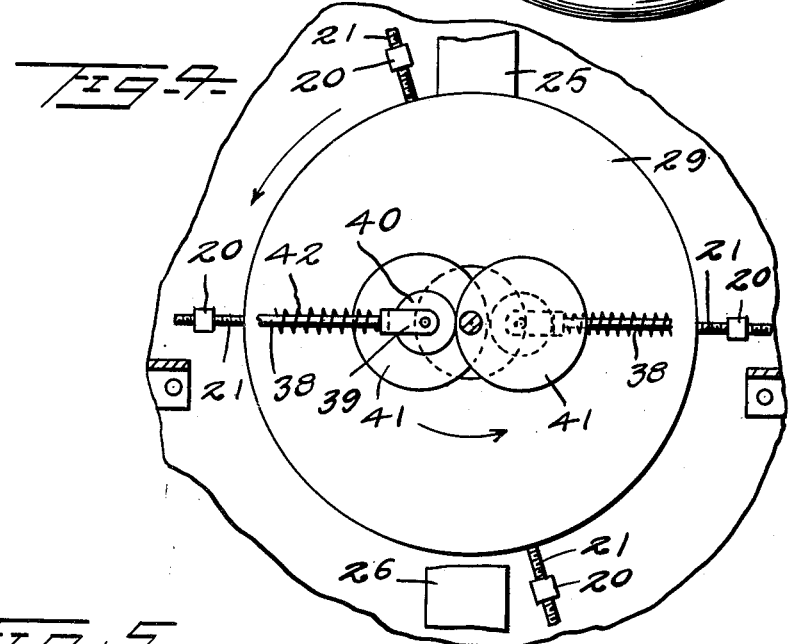
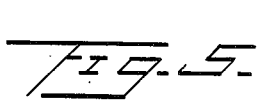
INVENTOR
*Comer C. Pierce*
BY *Kimmel & Crowell*
ATTORNEYS Oct. 20, 1953     C. C. PIERCE     2,656,094
TIRE PRESSURE DEVICE
Filed July 9, 1951     2 Sheets-Sheet 2
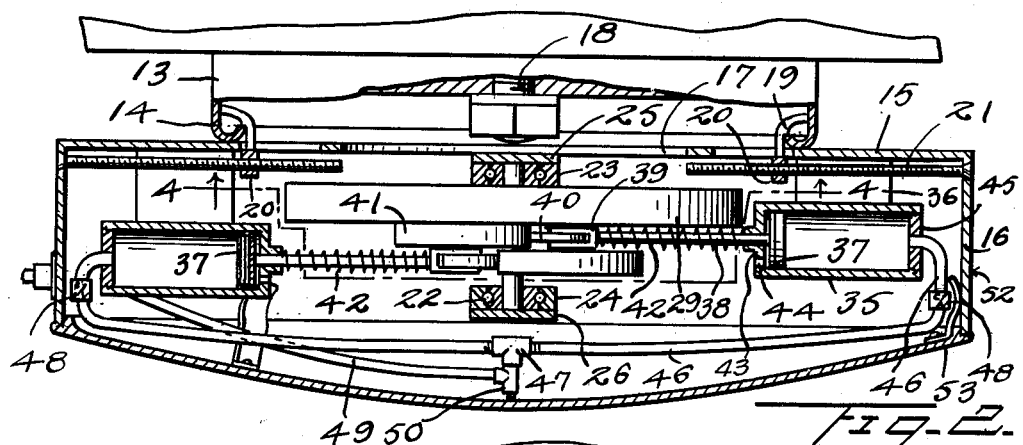
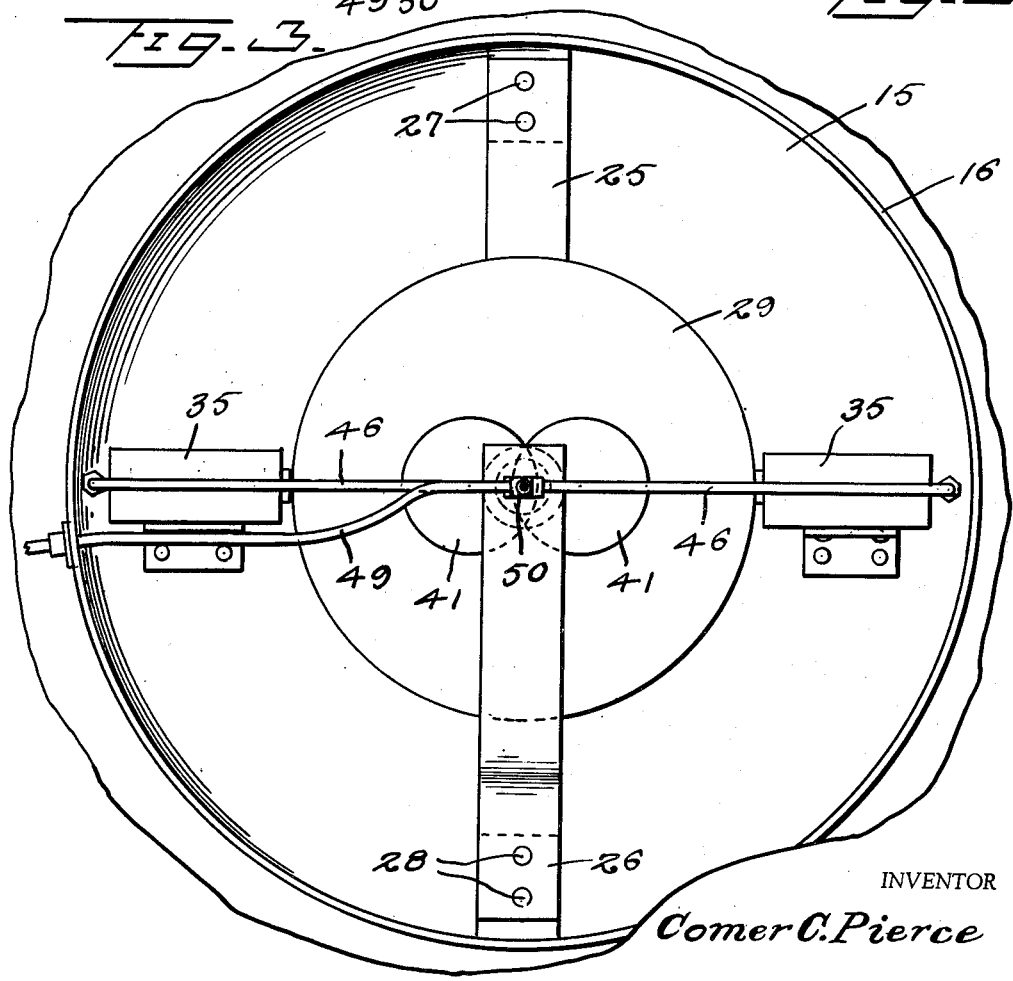
INVENTOR
*Comer C. Pierce*
BY *Kimmel & Crowell*
ATTORNEYS Patented Oct. 20, 1953

2,656,094

UNITED STATES PATENT OFFICE 2,656,094

TIRE PRESSURE DEVICE

Comer C. Pierce, Jacksonville, Fla.

Application July 9, 1951, Serial No. 235,855

5 Claims. (Cl. 230—34)

This invention relates to a means for maintaining a predetermined air pressure in vehicle tires.

An object of this invention is to provide an air pumping means mounted on a vehicle wheel and connected with the air valve of the tire which is operative when the vehicle is in motion and is being braked to restore air pressure in the tire.

Another object of this invention is to provide an air pumping means for each tire of a vehicle which is adapted to be mounted on the hub of the wheel in place of the normal hub cap. The device is so constructed that during the normal forward motion of the vehicle the pumping means will be inactive. When the vehicle is braked to slow down or stop the vehicle, a flywheel or weight will continue to rotate, and at this time the pumping means will be active to gradually restore the normal air pressure in the tire. When the normal pressure is attained in the tire, a safety or relief valve will be effective to bypass the air to the atmosphere.

With the above and other objects in view, my invention consists in the arrangement, combination and details of construction disclosed in the drawings and specification, and then more particularly pointed out in the appended claims.

In the drawings:

Fig. 1 is a detail side elevation of a vehicle wheel and tire having a pumping means mounted thereon constructed according to an embodiment of this invention;

Fig. 2 is a sectional view taken on the line 2—2 of Fig. 1;

Fig. 3 is a side elevation of the device in applied position with the cover or cap removed;

Fig. 4 is a fragmentary sectional view taken on the line 4—4 of Fig. 2;

Fig. 5 is a fragmentary side elevation of a modified form of pump.

Referring to the drawings, the numeral 10 designates generally a vehicle wheel of the disc type which has a tire 11 mounted thereon. The tire 11 includes a valve stem 12 connected with the inner tube for inflating or deflating the tube.

The wheel 10 is formed with an annular flange 13 on which normally the hub cap is mounted. The flange 13 is formed with an inwardly rolled bead 14 and the pumping means, to be hereinafter described, is clamped to the bead 14. A disc-shaped plate 15 abuts against the bead 14 and is formed with an annular side wall 16. The plate 15 is formed with a relatively large central opening 17 and said plate is concentrically secured with respect to the axle 18 of the wheel 10 by means of a plurality of securing hooks 19 having nuts or heads 20 through which adjusting and clamping bolts 21 threadedly engage. The bolts 21 extend through the side wall 16, as shown in Fig. 2.

A stub shaft 22 is disposed concentrically of the axle 18 and is journalled in bearings 23 and 24 carried by supporting bars 25 and 26. The bars 25 and 26 are oppositely disposed and the latter bar is disposed outermost. The bars 25 and 26 are secured by fastening means 27 and 28 to the outer side of the plate 15. A flywheel or disc-shaped weight 29 is fixedly disposed on the stub shaft 22 and is adapted to rotate with forward rotation of the wheel 10.

A pair of diametrically opposed pumping cylinders 35 are disposed within the side wall 16, being secured to the rear wall or plate 15 by supporting members 36. Each pumping cylinder 35 has a piston 37 slidable therein and a rod 38 extends from the piston 37 radially inwardly and is formed with a fork 39 between the arms of which a roller 40 rotatably engages.

An eccentrically disposed disc 41 is fixed relative to the weight or flywheel 29 on the outer side thereof and as shown in the drawings, there are two of these eccentric discs or cams 41, which are oppositely disposed. Roller 40 engages cam disc 41 so that piston 37 will be moved outwardly upon rotation of the cam 41. A spring 42 is disposed about each rod 38 bearing at one end against cylinder 35 and at the other end against fork 39 and constantly urges the piston 37 inwardly and holds roller 40 in contact with the cam 41. The cylinder 35 includes an inner head or wall 43 having an intake opening 44 and the cylinder 35 also includes an outer head 45 having an exhaust or outlet pipe 46 secured thereto. The two exhaust or outlet pipes 46 extend diametrically across the housing formed by the walls 15 and 16 and a T-connection 47 is disposed centrally between the cylinders 35. A pair of outwardly opening check valves 48 are interposed in pipes 46 adjacent cylinders 35. A conventional safety or relief valve 50 is also connected with the T-connection 47, and a pipe or tube 49 is connected between valve 50 and valve stem 12, so that when the tire 11 has a predetermined or normal pressure therein, the air pressure developed by the pumping cylinders 35 will be exhausted to the atmosphere. A cap 53 is removably mounted on housing 52, the latter comprising walls 15 and 16. The balance of the wheel 10 may be obtained by mounting a suitable weight in housing 52 equal to the weight of tube 49.

Referring now to Fig. 5 there is disclosed a modified form of air pump 35a in the form of a bellows having a rod 38a and an outlet pipe 46. Rod 38a is adapted to be reciprocated in the same manner as rod 38, and the remaining structure shown in Figs. 1 to 4 will be associated with bellows pump 35a.

In the use and operation of this device, the housing 52 is secured by the clamping members 19 to the hub or boss 13 of wheel 10. The valve stem 12 is connected with the pumping members by the tube 49.

During the normal forward movement of wheel 10, weight 29 will be held against rotation relative to wheel 10 by springs 42 so that weight 29 will not rotate relative to wheel 10. However, when wheel 10 is braked, so as to slow down the rotation of wheel 10, flywheel or disc 29 will continue to rotate and at this time the cam members 41 will effect reciprocation of the pistons 37 so that air pressure will be forced into the tire 11 through the valve stem 12. When the air pressure in tire 11 is normal or at a predetermined pressure, relief valve 50 will become active, so that the air pressure developed by reciprocation of the pistons 37 will be exhausted to the atmosphere.

Each wheel is adapted to have a device as hereinbefore described mounted thereon, so that the tires of each wheel will be constantly maintained at a predetermined pressure. This device can be readily mounted on a vehicle wheel by merely removing the conventional cap and securing the housing 52 in place of the original cap and connecting the valve stem 12 with the tube 49.

While I have shown a pair of pumping members 35 in housing 52 it will be understood that any number of such pumping members may be used.

What is claimed is:

1. In combination with a vehicle wheel and a tire on said wheel, a tire pressure maintaining means mounted on said vehicle wheel and connected with said tire, said means comprising a housing, means for mounting said housing on the hub of said wheel, a shaft disposed in said housing concentric with said wheel, a pair of diametrically opposed pumping members in said housing, a flywheel rotatable on said shaft, a pair of oppositely disposed cam members fixed to said flywheel, means extending from said pumping members engaging said cam members, a tubular connection between said pumping members and said tire, and a check valve in said connection adjacent each pumping member, whereby upon stoppage of said wheel continued rotation of said flywheel operates said pumping means.

2. In combination with a vehicle wheel and a tire on said wheel, a tire pressure maintaining means mounted on said vehicle wheel and connected with said tire, said means comprising a housing, means for mounting said housing on the hub of said wheel, a shaft disposed in said housing concentric with said wheel, a pair of diametrically opposed pumping members in said housing, a flywheel rotatable on said shaft, a pair of oppositely disposed cam members fixed to said flywheel, means extending from said pumping members engaging said cam members, a tubular connection between said pumping members and said tire, a check valve in said connection adjacent each pumping member, and a pressure relief valve in said connection, whereby upon stoppage of said wheel continued rotation of said flywheel operates said pumping members.

3. In combination with a vehicle wheel and a tire on said wheel a tire pressure maintaining means mounted on said vehicle wheel and connected with said tire, said means comprising a housing, means for mounting said housing on the hub of said wheel, a shaft disposed in said housing concentric with said wheel, a pair of diametrically opposed pumping members in said housing, a flywheel rotatable on said shaft, a pair of oppositely disposed cam members fixed to said flywheel, means extending from said pumping members engaging said cam members, a tubular connection between said pumping members and said tire, a check valve in said connection adjacent each pumping member whereby upon stoppage of said wheel continued rotation of said flywheel operates said pumping members, and a pressure relief valve in said connection, said pumping means comprising piston pumps and spring means associated with said piston pumps biasing said pistons towards retracted position.

4. The structure of claim 2 wherein said cam members are offset relative to each other along the longitudinal axis of said shaft.

5. The structure of claim 2 wherein the means extending from the pumping members and engaging the cams comprises bifurcated rods carrying rollers in the fork thereof, and said rollers about said cams.

COMER C. PIERCE.

References Cited in the file of this patent

UNITED STATES PATENTS

| Number | Name | Date |
| --- | --- | --- |
| 1,804,192 | Wilson | May 5, 1931 |
| 1,887,715 | Hester | Nov. 15, 1932 |